United States Patent [19]
Witzel et al.

[11] 3,812,896
[45] May 28, 1974

[54] CLOSURE MEMBER FOR ANTISKID CHAINS FOR TIRES

[75] Inventors: Gunter Witzel, Aalen; Anton Muller, Unterkochen, both of Germany

[73] Assignee: Eisen-und Drahtwerk Erlau Aktiengesellschaft, Aalen, Germany

[22] Filed: July 24, 1972

[21] Appl. No.: 274,629

[30] Foreign Application Priority Data
July 22, 1971 Germany.....................21365651

[52] U.S. Cl. ............................................. 152/242
[51] Int. Cl. ............................................ B60c 27/04
[58] Field of Search.................... 152/243, 242, 233

[56] References Cited
UNITED STATES PATENTS
1,339,978  5/1920  Pye ................................ 152/242
3,559,713  2/1971  Mueller........................... 152/243

Primary Examiner—James B. Marbert
Attorney, Agent, or Firm—Walter Becker

[57] ABSTRACT

A closure member, especially for antiskid tire chains in which a link member is open at one side and a holding member is seated on the outside of said link member in bridging relation to said opening while a clamping shoe inside the link member also bridges said opening and nests in and is clamped to said holding member.

12 Claims, 8 Drawing Figures

PATENTED MAY 28 1974  3,812,896
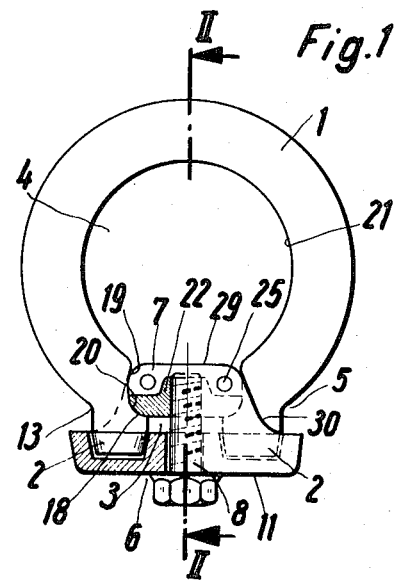
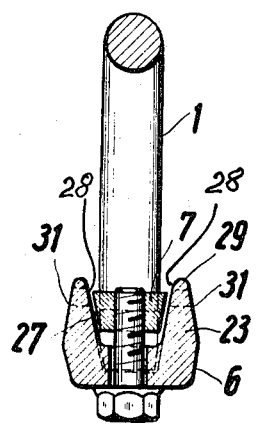
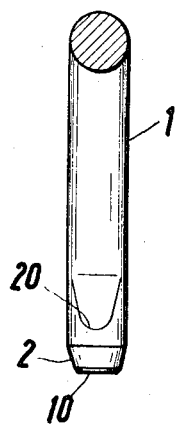
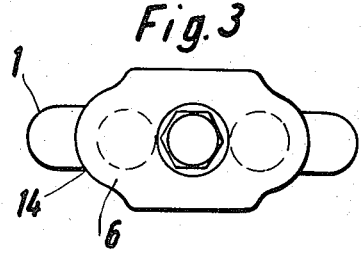
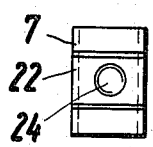
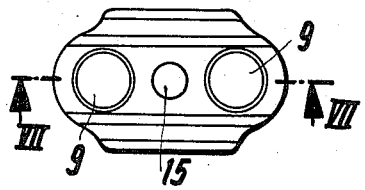
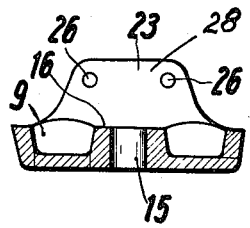
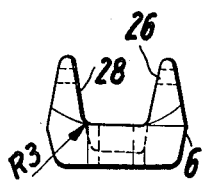

CLOSURE MEMBER FOR ANTISKID CHAINS FOR TIRES

The present invention relates to a closure member for anti-skid chains for tires in which the closure member has an annular element and a lock which is to be arranged on the two legs of said annular element which freely project and form a suspension opening for the elements to be interconnected. The invention more specifically refers to a closure member of the above mentioned type in which said lock includes a holding element adapted to be placed upon the leg ends and also includes a clamping shoe which is located opposite said holding member and while engaging the inner surface of said annular member adjacent to the suspension opening is connected by a clamping element, especially a clamping screw to said holding member.

It is an object of the present invention so to design a closure member of the above mentioned type that in spite of small dimensions a highly reliable hold will be assured.

This object and other objects and advantages of the invention will appear more clearly from the following specification, in connection with the accompanying drawings, in which:

FIG. 1 illustrates a closure member according to the invention, partly in view and partly in section.

FIG. 2 represents a section taken along the line II—II of FIG. 1.

FIG. 3 shows the closure member of FIG. 1 as seen from below.

FIG. 4 illustrates the annular portion of the closure member in an illustration similar to that of FIG. 2, but without the lock.

FIG. 5 is a top view of the clamping shoe of FIG. 2.

FIG. 6 represents a top view of the holding member of FIG. 1.

FIG. 7 is a section taken along the line VII—VII of FIG. 6.

FIG. 8 shows the holding member of FIG. 7 as seen from the right-hand side thereof with regard to the drawing.

The closure member for antiskid chains for tires according to the present invention is characterized primarily in that the clamping shoe which at least partially extends into the holding member has that region thereof which engages the holding member provided with lateral surfaces which in a wedge-shaped manner are inclined toward each other, and which have located directly opposite thereto correspondingly inclined inner surfaces of the holding member. In this connection it is particularly expedient when the clamping shoe is completely located within the preferably U-shaped holding member.

According to a further feature of the invention, the clamping shoe rests against the inner sides of the legs of the annular member, preferably on shoulders thereof which are formed by recesses on the inside of the legs. A particularly reliable hold is obtained when the shoulders are rounded over approximately a quarter of a circle and when the clamping shoe with corresponding countersurfaces has approximately its entire surface resting against these shoulders. In particular, in this instance, the clamping shoe may be located in a space-saving manner and in a protected manner, completely between the legs of the annular member. The clamping shoe, expediently within the range of a threaded bore for the clamping screw is provided preferably over its entire width with a greater cross-sectional height than within the range of its end so that on one hand the clamping shoe is relatively light and on the other hand a safe guiding of the clamping shoe will be assured. That section which has the greater cross-sectional height may, in a simple manner, be formed by a protrusion on that side of the clamping shoe which faces toward the center of the annular member so that no danger will exist that the clamping shoe abuts the bottom surface of the holding member.

The closure member according to the present invention acts only very mildly upon the vehicle tire when the leg of the U-shaped holding member also in the transition range with the U-shaped transverse web has a smaller width with regard to the length thereof and preferably has its substantially S-shaped side edges merge with those edges which face toward the center of the annular member.

For purposes of facilitating the mounting of the holding member upon the legs of the annular member, especially blind hole shaped receiving openings are conically formed in the holding member for receiving the annular member. Preferably, the ends of the legs are correspondingly conically designed. In this way, a very small width of the lock can be realized when the inner surfaces of the receiving openings through substantially straight mantle lines merge with the equally inclined inner surfaces of the legs of the holding member.

The vehicle tire and the closure member at that side where it may get into contact with the ground will be further saved by the closure member according to the invention when the lateral surfaces of the holding member extend away from those edges facing toward the center of the annular member and flare in the direction toward the edge which faces away from said last mentioned edges. This will be further improved when the lateral surfaces of the holding member spread at an incline from the edge of the holding member, which edge faces toward the center of the annular member and extend to the edge facing away therefrom so that nearly crowned surfaces of the holding member are obtained.

In order to be sure that the chain links engaging the closure member will have a particularly satisfactory moveability also within the region of the lock, those edges of the holding member which face toward the center of the ring part extend — in side view — up to the inner surfaces of the legs of the ring part (said surfaces being located opposite to each other) in that region in which these inner surfaces merge with the curved inner surfaces of the ring part, in such a way that these edges form approximately a steady continuation of the inner surface of the ring part.

A particularly advantageous further development of the object according to the invention consists in that a safety member, especially a spiral pin is provided on the legs of the holding member. This spiral pin catches behind the clamping shoe on that side which faces toward the center of the ring part so that also in case of an accidental self-detachment of the clamping screw, the lock or closure member will safely remain closed. With a simple space saving design, the safety member is located adjacent to the protrusion of the clamping shoe while preferably at both sides of the protrusion there is respectively arranged a safety element.

Referring now to the drawing in detail, FIGS. 1 to 8 illustrate a closure member according to the invention which comprises an open ring part 1 which extends over a circumferential angle of approximately 300° and the end legs 2 of which extend parallel toward the outside away from the center of the link. The ring part 1 preferably has a circular cross section. Between the legs 2 the ring part 1 forms an insert opening 3 for links to be suspended in the ring part. These links will then extend through the receiving opening 4 formed by the ring part 1. The suspension opening 1 is closed by a lock 5 which comprises a holding member 6 and a clamping shoe 7. These parts 6 and 7 are adapted to be clamped in with regard to the ring part 1 by means of a clamping screw 8.

The holding member 6 comprises a bottom plate and a side web 23 similar to a U-profile. The bottom plate has two plug openings in the form of blind holes for receiving the legs 2 of the ring part 1 which legs have their end faces 10 engaging the bottom surfaces of the openings 9. That surface of the bottom plate of the holding member 6 which faces toward the center of the ling is arranged in spaced relationship to the concavely rounded transition sections 13 between the legs 2 and the adjacent zones of the ring part 1. The end edges 14 of the holding member 6 are rounded semi-circularly about the axes of the plug openings 9, and more specifically are rounded at a radius which is less than half the width of the holding member 6 so that the shape illustrated in FIG. 3 will be obtained. Between the plug openings 9, the bottom plate of the holding member 6 is provided with a passage or bore 15 for the clamping screw 8. The head of said clamping screw 8 engages the outer surface 11 of the bottom plate of the holding member 6, said clamping screw 8 preferably being formed by a self-locking screw. Oppositely located to the plane inner surface 16 of the holding member 6, which inner surface 16 is parallel to the outer surface 11, there is located the clamping shoe 7 which likewise is approximately plate-shaped. The clamping shoe 7 has those ends of that side thereof which face toward the holding member 6 provided with quarter circle-shaped rounded edges 18 by means of which the clamping shoe 7, approximately over its entire surface, engages correspondingly quarter circle-shaped rounded shoulder surfaces 20 on the inner side of the legs 2. These shoulder surfaces 20 are formed by recesses 19 provided on the mutually facing inner sides of the legs 2 of ring part 1. The clamping shoe 7 is located completely between the legs 2 of the holding part 6 and between the legs 2 of the ring part 1. The clamping shoe 7 is provided with a threaded bore 24 for receiving the clamping shoe 8. This threaded bore 27 is located within the region of a protrusion 22 which extends over the entire width of the clamping shoe 7 and protrudes in the direction toward the center of the link. Adjacent to and on both sides of the protrusion 22, the clamping shoe 7 is, on that side which faces toward the link center, caught behind by spiral clamping pins 25 which are respectively held with press fit in a pair of aligned bores 26 in the legs 23 of the holding member 6.

The lateral surfaces 27 of the clamping shoe 7 extend away from the link center and at an acute angle taper toward each other in such a way that the clamping shoe 7 will be wedge shaped. The inner surfaces 28 of the legs 23 of the holding member 6 are correspondingly inclined in such a way that with the closing member in closed condition, the lateral surfaces 27 are directly adjacent to the inner surfaces 28. The plug openings 9 in the holding member 6 are likewise conically designed at an angle which equals the angle between the two inner surfaces 28 of the holding member 6. The plug openings 9 directly merge through rectilinear mantle lines with the inner surfaces 28. The ends of the legs 2 of the ring part 1 are conically designed in conformity with the plug openings 9, but have a slightly shorter diameter so that they will have their end faces safely engage the bottom surfaces of the plug opening 9.

Those edges 29 of the two legs 23 of the holding member 6 which face toward the edges 29, have a length which corresponds to approximately the width of the inlet opening 3 within the region of the recesses 19. These edges 29 form an approximately continuous continuation of the curved inner surface 21 of the ring part 1 and may also be correspondingly concavely curved. The width of the legs 23 of the holding member 6 is also at the area where it merges with the bottom plate less than the length of the legs 23 which have approximately S-shaped curved side edges 30, and in side view according to FIG. 1 laterally do not protrude beyond the sides of the legs 2 of ring part 1, which sides face away from each other.

The outer surfaces 31 of the legs 23 of the holding member 5 extend from that edge 29 of the holding member 6 which faces toward the link center and also from that edge or surface 11 which faces away from edge 29 in the respective direction toward the oppositely located edge at an acute angle away from each other in such a way that these outer surfaces 31 are approximately crowned.

It is, of course, to be understood that the present invention is, by no means, limited to the particular showing in the drawing, but also comprises any modifications within the scope of the appended claims.

What is claimed is:

1. A closure member for use with antiskid tire chains coprising in combination: a link member having an opening at one side with the free ends of the legs of the member in opposed spaced relation on respective sides of the openings, and means for closing said opening comprising a first element engageable with said legs in the regions of the ends of said legs outside said link member and a second element in opposed relation to said first element and engageable with said legs in the region of the ends of said legs inside said link member, and a clamp securing said elements together under tension, said first element having side parts projecting therefrom along the outside of said link member and along the sides of said second element and defining a longitudinal recess having side walls diverging toward said second element, said second element having side walls converging toward said first element and complementarily engaging the side walls of said recess.

2. A closure member in combination according to claim 1 in which said second element when clamped to said first element is disposed in its entirety within the limits of said side parts of said first element.

3. A closure member in combination according to claim 1 in which the end parts of said legs are angled off in the plane of said link member toward the outside of the link member, the sides of said end parts of said legs which face each other being notched so as to have first portions near the inside of the link member which are parallel and second portions at the ends of said first portions remote from the inside of said link member which extend toward each other, said second element having an end region resting in each notch, said notches and the said end regions of said second element being rounded at the junctures of said portions of said notches.

4. A closure member in combination according to claim 3 in which said second element is disposed in its entirety within the radial limits of said end parts of said legs.

5. A closure member in combination according to claim 1 in which said clamp is a screw extending through said first element and threaded into said second element in about the middle of the length thereof, said second element having a thickened region in the middle where the screw is threaded therein, said thickened region comprising a protrusion on the side of said second element which faces the inside of said link member.

6. A closure member in combination according to claim 1 in which said side parts of said first element have a smaller width dimension than length dimension and when viewed from the side have concave end surfaces which merge with a top surface facing the inside of said link member.

7. A closure member in combination according to claim 1 in which the extreme ends of said legs are frustoconical on parallel axes, said first element having frustoconical recesses to receive said extreme ends of said legs, the lateral walls of said recesses merging with the said side walls of said longitudinal recess.

8. A closure member in combination according to claim 1 in which the outer walls of said side parts of said first element diverge in a direction away from the inside of said link member.

9. A closure member in combination according to claim 8 in which the outer side walls of said first element diverge toward the inside of said link member and merge with the outer walls of said side parts of said first element.

10. A closure member in combination according to claim 1 in which the edges of said side parts of said first element facing inwardly of said link member form substantially a continuation of the inner periphery of said link member from one side of said opening to the other.

11. A closure member in combination according to claim 1 in which said second element has a protrusion in the middle projecting toward the inside of said link member, said clamp comprising a screw extending through said first element and threaded into said second element in the region of said protrusion, said side parts of said first element projecting beyond said second element toward the inside of said link member at the circumferential sides of said protrusion, and lock means extending through said side parts between said protrusion and at least one end of said second element to lock said elements together.

12. A closure member in combination according to claim 11 in which said lock means comprises a pin extending through said side parts of said first elements on each circumferential side of said protrusion and inwardly from the respective ends of said second element.

* * * * *